Dec. 26, 1950   H. RINIA ET AL   2,535,519
FIVE ELEMENT HOT-GAS MOTOR WITH MEANS FOR
HEATING THE GAS THEREOF EXCLUSIVELY
IN THE HEATER ELEMENT THEREOF
Filed Aug. 29, 1945   2 Sheets-Sheet 1

INVENTORS
HERRE RINIA
HEINRICH DE BREY
FRANCISCUS LAMBERTUS VAN WEENEN
YSBRAND BOERS
GABRIEL LEONARD SYPKENS &
WILLEM JAN VAN HEECKEREN

BY
ATTORNEY

Dec. 26, 1950  H. RINIA ET AL  2,535,519
FIVE ELEMENT HOT-GAS MOTOR WITH MEANS FOR
HEATING THE GAS THEREOF EXCLUSIVELY
IN THE HEATER ELEMENT THEREOF

Filed Aug. 29, 1945  2 Sheets-Sheet 2

INVENTORS
HERRE RINIA
HEINRICH DE BREY
FRANCISCUS LAMBERTUS VAN WEENEN
YSBRAND BOERS
GABRIEL LEONARD SYPKENS &
WILLEM J. VAN HEECKEREN

BY
ATTORNEY

Patented Dec. 26, 1950

2,535,519

UNITED STATES PATENT OFFICE 2,535,519

FIVE ELEMENT HOT-GAS MOTOR WITH MEANS FOR HEATING THE GAS THEREOF EXCLUSIVELY IN THE HEATER ELEMENT THEREOF

Herre Rinia, Heinrich de Brey, Franciscus Lambertus van Weenen, Ysbrand Boers, Gabriel Leonard Sypkens, and Willem Jan van Heeckeren, Eindhoven, Netherlands, assignors to Hartford National Bank & Trust Co., Hartford, Conn., as trustee Application August 29, 1945, Serial No. 613,394
In the Netherlands May 5, 1941

Section 1, Public Law 690, August 8, 1946
Patent expires May 5, 1961

6 Claims. (Cl. 60—24)

In the known hot-gas motors, which also include hot-air motors, a certain amount of gas is heated in a closed chamber termed hot chamber. As a result of this heating the pressure of the gas increases. This gas with increased pressure flows to a second chamber, termed cold chamber, which freely communicates with the first-mentioned chamber and wherein this gas sets a working piston in motion, expands and cools down. A second piston, termed displacer, penetrates into the hot chamber to such extent that substantially all the gas, except that which is contained in the unavoidable disadvantageous chamber, is driven out of the hot chamber. The gas which, after expansion, is contained in the cold chamber may be carried off to the outside atmosphere. In this case use is made of air as medium in the motor. The movement of the displacer out of the hot chamber has the effect of sucking a new amount of air into the hot chamber. Motors of this kind are termed motors with open cycle.

Hot-gas motors are also known in which the gas, after expansion, is maintained closed up in the cold chamber and cooled down there. In this case the gas pressure decreases and the working piston may make the entering stroke. The displacement of the displacer has the effect of bringing the same amount of gas back to the hot chamber. Motors of this kind are termed motors with closed cycle.

The present invention solely relates to hot-gas motors with closed cycle, which also include motors in which a certain amount of gas may be taken from the cycle or added thereto, for example to compensate losses due to leakage.

With hot-gas motors it is known to arrange a regenerator in the path of the gases between the hot and the cold chambers. Part of the heat of the expanding gases flowing out of the hot chamber is taken up by this regenerator. During the flowing back of the cooled gases from the cold to the hot chamber this heat is given off to the gases, which results in less heat getting lost through cooling for the working process. With an unvaried amount of heat supplied from the exterior to the motor and unvaried cylinder contents the use of the regenerator consequently has the effect of increasing the induced power of the motor. The fixed losses of the motor, such as radiation, remains substantially unvaried, so that the total efficiency increases.

The power per unit of cylinder contents also increases with a more complete heating and cooling of the medium. As a matter of fact, if not all the medium is brought completely heated or cooled into the hot and cold chambers respectively, the cycle is also accomplished by an amount of medium which has not taken up the total available energy and consequently cannot give off the largest possible portion of this energy. Consequently, in the case of poor cooling and heating larger cylinder contents would be required for obtaining a definite power, resulting also in an increase in value of the fixed losses.

In a known hot-gas motor with closed cycle the medium traverses a regenerator from the hot to the cold chamber. The heating and the cooling of the medium is effected in the hot and cold chambers respectively. Since the gas comes into contact with the hot and the cooled surfaces only as far as the wall of these chambers is concerned, the gas which is not in the immediate vicinity of the wall will attain a sufficient increase in temperature only if the time available therefor is very long. It would ensue therefrom that the speed of the motor must be maintained very low.

For obtaining a definite power it is also possible to use a large amount of medium with unvaried pressure so that the motor becomes large-sized and the losses proportionally increase. In order to house a larger amount of medium with unvaried size of the motor, it is also possible to increase the pressure of the medium. The increase in pressure does not result in an increase in heat conductivity, but the specific heat does increase, so that the conditions for the heat-transmission become still worse.

Hot-gas motors with closed cycle are known which are equipped with a hot chamber, a heater, a regenerator, a cooler and a cold chamber and in which the gaseous medium on its way from the hot to the cold chamber traverses the heater, the regenerator and the cooler in this sequence or, during the movement from the cold to the hot chamber, in the reversed sequence. In this case, however, there is intermediate the regenerator and the cooler proper a chamber in which the gas strokes along a heated surface. A certain amount of heat of this heated surface is emitted to the gaseous medium, which heat is carried off in the cooler immediately following and is lost for the working process. The efficiency of this hot-gas motor is thus highly detrimentally affected.

According to the invention, this drawback is also obviated by making the motor of such a construction that the gaseous medium is solely heated in the heater. The supply of heat in other points of the cycle where the heat in the gas cannot be used or cannot be used completely is thus avoided.

By the terms "heater" and "cooler" we mean here members which serve to exchange heat with the gaseous medium, the latter over the path of flow being limited by at least two surfaces exerting a heating and a cooling action respectively on the medium and the heat being supplied from and carried off respectively to the outside.

By the terms "heater" and "cooler" we may here also mean members which serve to exchange heat with the gaseous medium, the gaseous current being subdivided into a large number of at least five separate parts. This subdivision may be varied in the direction of the gaseous current. The heat-transmission is improved by the collisions produced as a result of this subdivision. The heater as well as the cooler may have properties as mentioned in the foregoing.

By the terms "hot chamber" and "cold chamber" we mean here chambers whose size during the cycle varies from nought to a finite value and which are destined to contain a hot and a cold portion respectively of the medium. The other chambers of constant volume of the motor, which contain the medium, are disadvantageous chambers.

It is known to provide a hot-gas motor having a closed cycle with a hot chamber, a regenerator, a cooler and a cold chamber, the medium being heated between the hot chamber and the regenerator. This is effected in a channel having only one wall which has heat supplied to it and, in addition, is not subdivided so that in this case there is no question of a heater in the sense of the present invention. As it has already been explained in the foregoing, this poor heating of the medium results in the energy per unit of cylinder contents being extremely small.

To obtain the optimum power per unit of cylinder contents and in connection therewith the optimum efficiency it is not sufficient that four out of five said elements are present, since each deviation from the invention renders the energy per unit of cylinder contents very small, which may also result in a considerable decrease in efficiency. Whereas the known hot-gas motors have an energy per unit of cylinder contents of about 0.2–0.7 W./cm.$^3$, it is a surprising fact that in the motor according to the invention, which consequently comprises the above-stated five elements, the energy per unit of cylinder contents comparable with these values lies at 3.5 W./cm.$^3$ and even much higher, for example 7 W./cm.$^3$, as has been found by experiments. Consequently, with regard to the known motors an energy per unit of cylinder contents is attained which is ten or even more times higher than that of the known machines.

In a known machine the absence of a hot chamber makes it necessary for the amount of medium required for the cycle to be housed in the heater. Since this chamber must be capable of containing substantially all the medium the contents thus become disadvantageous for a rapid and complete heat-transmission.

The absence of a heater and/or cooler detrimentally affects the heating and the cooling of the medium so that the efficiency decreases, as has been explained in the foregoing.

The absence of a regenerator not only gives a high loss of heat, as has been explained in the foregoing, but the heater thus also directly adjoins the cooler so that a loss of heat through conduction from the heater to the cooler is unavoidable. By the interposition of an insulated intermediate piece this loss may be reduced, it is true, but this results also in an extension of the disadvantageous chamber in the motor.

According to the invention, the above-stated five elements of the hot-gas motor are constructively arranged relatively to each other and to the piston and the displacer of the motor, in such manner that the heater, the regenerator and the cooler in the direction of movement of the piston and of the displacer are located directly behind each other and about the piston and the displacer. In this case the heater is of course located on the side of the hot chamber and the cooler on the side of the cold chamber.

The above-mentioned arrangement permits of obtaining an extremely simple and compact structure of the hot-gas motor. The medium flows from the hot chamber along the outside of the displacer through the heater and the regenerator and the cooler to the cold chamber. The hot and the cold chambers may have a wall common with the heater and with the cooler so that the losses of heat are reduced. Moreover, the arrangement of the heater, regenerator and cooler about the displacer offers constructively the advantage that with a definite required surface of flowing of these elements the dimensions of the motor normal to the axis of the piston and of the displacer are minimum, which leads to minimum losses of heat due to radiation.

According to the invention, in order to obtain an approximation of the isothermal expansion and compression in the motor which are advantageous in themselves, the hot chamber is preferably preceded by an additional heater and the latter is preceded by an additional hot chamber. In this construction, during the expansion from the hot chamber, the expanded gas is conducted twice along the heater so that the cooling produced by the expansion is at least partly compensated by an additional supply of heat. During the compression a similar case occurs, since the cold chamber may be followed by a second cooler and a second cold chamber so that the gas compressed from the cold chamber may give off the heat produced during compression in the second cooler before being compressed further. This contributes to an isothermal compression.

This invention will be more clearly understood by reference to the accompanying drawings showing by way of example, a few embodiments thereof.

Fig. 3 is another form of construction of a hot-gas motor according to the invention.

Figure 1:
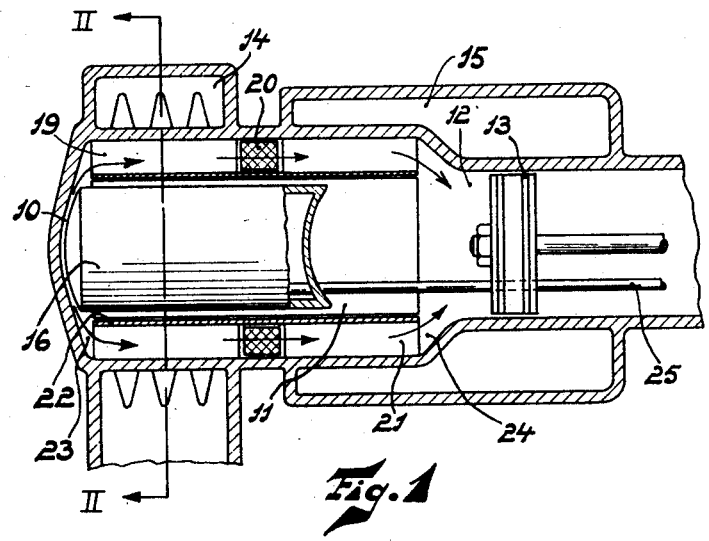
Fig. 1 shows in part schematically a hot-gas motor according to the invention in longitudinal section.

The hot-gas motor of the type illustrated in Fig. 1 is constituted by a working cylinder comprising inter alia the hot chamber 10 and the cold chamber which is constituted by two sections 11 and 12. The section 12 has the form of a cylinder jacket for the working piston 13. In the position shown the displacer 16 has penetrated completely into the hot chamber 10 so that only the disadvantageous space thereof, i. e. a small necessary piston clearance between the head of the displacer 16 and the cylinder head beside the supply channels to the heater 19, is left free.

Figure 2:
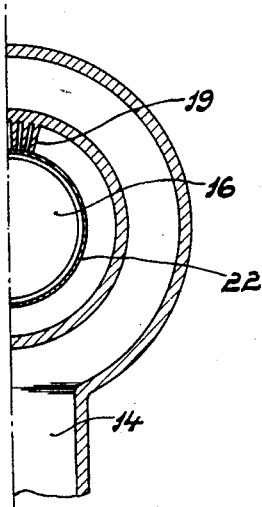
Fig. 2 is a cross-sectional view of the hot chamber of this motor taken on line II—II of Fig. 1.
Figure 2:
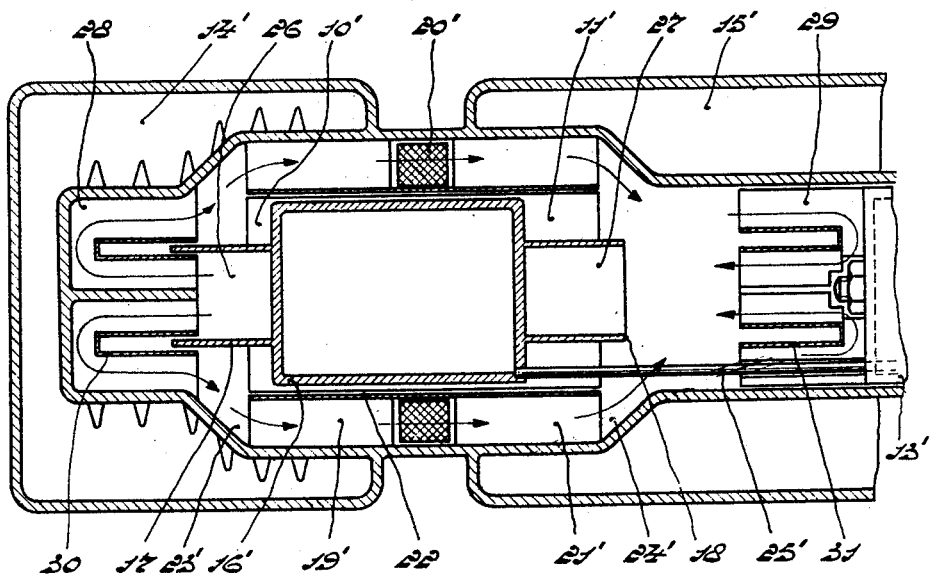

The hot chamber 10 is surrounded by the heater 19 which subdivides the gaseous current from the hot chamber 10. This heater comprises approximately a hundred axial ribs which are shown in section in Fig. 2. In comparatively large motors this number of ribs may rise, for example, to 250. As a matter of fact, the gaseous current may also be subdivided in numerous other manners. Between the ribs shown narrow channels are recessed through which flows the gas to be heated. These ribs are cast as a whole or in any case connected in good heat-conductive manner to the wall of this heater, which directly adjoins the heating channel 14 through which the required heat is supplied from the exterior to the heater. As previously mentioned, the gas to be heated flows in the channels between the ribs so that the gas is in contact with at least two surfaces which emit the heat to the gas and have this heat supplied to them from the exterior, viz. from the channel 14. A metal bush 22, which exactly fits into the inner periphery of these ribs, prevents direct communication between the hot chamber 10 and the heater 19, so that the gas displaced by the displacer 16 is forced to flow through the annular channel 23 into the heater and can leave the latter only at the opposite end towards the regenerator 20.

In this regenerator 20 the heated expanding gas emits part of its heat and subsequently enters into the cooler 21. The latter, like the heater 19, contains a certain number of axial ribs between which narrow channels are recessed. As before, the gas during the flowing through the cooler is in contact with at least two surfaces which take over the heat from the gas, emitting it through the wall of the cooler to the cooling jacket 15. The latter extends in addition over part 12 of the cold chamber, in which the piston moves, so that the friction surfaces of the piston 13 are always maintained cool. The lubrication of this piston and the gas-tight obturation by means of piston springs does not involve particular difficulty at this low temperature.

The cooler 21 is also obturated from the cold chamber 11 by means of the cylindrical sleeve 22 which fits into the inner periphery of the ribs so that the gaseous current from the regenerator 20 has to traverse the whole cooler to come subsequently by means of the annular channel 24 in the cold chambers 11 and 12 above the working piston 13. The said sleeve 22 is consequently located in the hot chamber opposite the heater as well as opposite the regenerator 20 and opposite the cooler and the cold chamber. The portion of this sleeve which is located in the hot chamber consequently attains a considerably higher temperature than the portion which is located in the cold chamber so that a constant hot current will flow through the wall of this sleeve from the hot to the cold chamber, which means a loss of heat for the circuit. In order to minimize this loss, the wall of the sleeve has a small thickness and is, in addition, made of material which retains its form at the high temperature prevailing in the hot chamber and has a poor heat-conductivity. The material used for this purpose may be, for example, an iron alloy containing cobalt and nickel.

The displacer 16 is also located in part in the hot chamber and in part in the cold chamber so that here the same remark applies as for the sleeve 22. At the operating temperature of the motor which prevails in the hot chamber it would practically be impossible to guide the displacer 16 into the sleeve 22. Consequently, the outer diameter of the displacer 16 is made smaller than the inner diameter of the sleeve 22 to such extent that these components do not make contact during operation. A difference in diameter of 0.2 mm. for small machines and up to 2 mms. for large machines suffices to this end. The guidance of the displacer 16 must be located in another portion of the motor, i. e. preferably in the cold chamber, so that the lubrication does not involve difficulty. In the form of construction shown the displacer rod 25 is guided into the body of the piston 13.

During the operation of the motor the piston and the displacer periodically move to and fro relatively to the motor due to the movement of the rotating crank and since the cranks of the piston and of the displacer form an angle of 50° to 90° the piston and the displacer also move relatively to one another.

In the position shown the displacer 16 has arrived at the end of the entering stroke, i. e., the displacer has penetrated as far as possible into the hot chamber. The movement preceding the position shown has consequently driven the gas out of the hot chamber. Since, as has already been mentioned above, the piston clearance between the displacer 16 and the sleeve 22 is limited to a value necessary for constructional reasons, the gas will practically be forced to flow in the direction of the arrows shown through the annular channel 23 to the heater 19. Therefrom the gas expands also in the direction of the arrows shown through the regenerator 20 and the cooler 21 to the cold chambers 11, 12. In these chambers the gas pressure increases and the piston 13 makes the outgoing stroke.

During the movement subsequent to the position shown in Fig. 1, the displacer 16 moves again in the outgoing direction. At the end of the outgoing stroke, the working piston 13 makes the entering stroke and consequently approaches the displacer 16. The cold chamber 11 becomes smaller but the hot chamber 10 becomes larger so that the gas is now displaced in a direction opposite to that of the arrows through the cooler 21, the regenerator 20 and the heater 19 to the hot chamber 10. When the displacer 16 and the piston 13 practically engage each other, i. e., with a spacing of, say, 0.1 mm., the cold chamber has become nil. The remaining space formed by the necessary clearance between the piston and the displacer and the space which is not covered by the piston and the displacer, such as the annular channel 24, constitutes the disadvantageous space.

Fig. 3 shows another form of construction of a hot-gas motor according to the invention. The parts such as the hot chamber, the heater, the regenerator, the cooler and the cold chamber are substantially identical to those of the forms of construction shown in Figs. 1 and 2. Like parts are designated by the same reference numerals primed.

In the present form of construction the hot chamber 10' is preceded by an additional heater 28 and a second hot chamber 26 and further the cold chamber 11' is followed by another cooler 29 and subsequently by a second cold chamber 27.

The heater 28 is housed in the head of the cylinder in the form of a few ribs extending in the axial direction of the cylinder with narrow channels between them. Due to the presence of some sleeves 30 which are pushed on the edges of the ribs the gaseous current is forced to traverse these channels from the beginning to the end according to the direction indicated by the arrow in Fig. 3. The second hot chamber 26 is formed between the head of the cylinder and the cylindrical extension 17 with which the displacer 16' is provided. As a result of the movements of the displacer, the cylindrical extension 17 penetrates into the additional heater 28 so that the chamber 26 is periodically enlarged and reduced and thus satisfies the requirements which a hot chamber has to satisfy.

The second cooler is secured to the piston 13' which for this purpose is cooled artificially in known manner with the aid of air or water which is supplied and carried off through the piston rod. This cooler is also constituted by a certain number of ribs extending in the axial direction of the cylinder and having narrow channels between them. Owing to the presence of the sleeves 31, direct communication with the cold chamber is avoided so that the gases have to follow the path indicated by the arrow in Fig. 3.

The second cold chamber 27 is formed by a cylindrical extension 18 of the cylinder 16 which penetrates into the cooler 29 and moves out of it due to the periodic movement of the displacer 16' and of the piston 13'.

The provision of the above-stated second heater between the two hot chambers permits of obtaining an approximation of the isothermal expansion in the cylinder which in itself is advantageous for the hot-gas motor. The cooling which the medium undergoes as a result of the expansion is compensated by the additional heat supplied to the gas in the heater 28. Similarly, the second cooler 29 improves the isothermal compression.

What we claim is:

1. A closed cycle hot-gas motor comprising means defining a hot chamber, a regenerator, conduit means connecting said hot chamber with said regenerator, a heater operatively associated with said conduit means for applying heat directly only to the gas in said conduit means and forming a heater means therewith, said conduit means comprising means forming a multiplicity of paths for the passage therethrough of the gas of said motor, means defining a cold chamber, second conduit means connecting said cold chamber with said regenerator, and a cooler interposed between said regenerator and said cold chamber and operatively associated with said second conduit means, said hot chamber, heater means, regenerator, cooler, and cold chamber constituting separate cycle elements of said motor, and the minimum volume of said hot chamber being substantially zero as determined by constructional clearances of the hot chamber defining means.

2. A closed cycle hot-gas motor comprising means defining a hot chamber, a regenerator, conduit means connecting said hot chamber with said regenerator, a heater operatively associated with said conduit means for applying heat directly only to the gas in said conduit means and forming a heater means therewith, said conduit means comprising means forming a multiplicity of paths for the passage therethrough of the gas of said motor, means defining a cold chamber, second conduit means connecting said cold chamber with said regenerator and a cooler interposed between said regenerator and operatively associated with said second conduit means and said cold chamber, said second conduit means comprising means forming a multiplicity of paths for the passage therethrough of the gas of said motor, said hot chamber, heater means, regenerator, cooler, and cold chamber constituting separate cycle elements of said motor, and the minimum volume of said hot chamber being substantially zero as determined by constructional clearances of the hot chamber defining means.

3. A closed cycle hot-gas motor comprising a reciprocating displacer member defining a hot chamber, a regenerator, conduit means connecting said hot chamber with said regenerator, a heater operatively associated with said conduit means for applying heat directly only to the gas in said conduit means and forming a heater means therewith, the regenerator and said conduit means comprising means forming a multiplicity of paths for the passage therethrough of the gas of said motor, a reciprocating piston member defining a cold chamber second conduit means connecting said cold chamber with said regenerator, and a cooler interposed between said regenerator and said cold chamber and operatively associated with said second conduit means, said heater, regenerator and cooler being arranged concentric to and surrounding the said hot chamber and the displacer member, said hot chamber, heater means, regenerator, cooler, and cold chamber constituting separate cycle elements of said motor, and the minimum volume of said hot chamber being substantially zero as determined by constructional clearances of the said displacer in the said hot chamber.

4. A closed cycle hot-gas motor comprising means defining a first hot chamber, means defining a second hot chamber, first conduit means connecting said first hot chamber with said second hot chamber, a first heater operatively associated with said first conduit means for heating the gas of said motor therein, said conduit means and said first heater comprising a first heater means, a regenerator, second conduit means connecting said first hot chamber with said regenerator, a second heater operatively associated with said second conduit means for heating the gas of said motor therein, said second conduit means comprising means forming a multiplicity of paths for the passage therethrough of the gas of said motor, said second conduit means and said second conduit means comprising a second heater means, means defining a cold chamber, third conduit means connecting said regenerator with said cold chamber, a cooler operatively associated with said third conduit means for cooling the gas of said motor therein, said cooler and said third conduit means comprising a cooler means, said hot chambers, said heater means, said regenerator, said cooler means, and said cold chamber constituting separate cycle elements of said motor, and the minimum volume of said hot chambers being substantially zero as determined by constructional clearances of the hot chamber defining means.

5. A closed cycle hot-gas motor comprising means defining a first hot chamber, means defining a second hot chamber, first conduit means connecting said first hot chamber with said second hot chamber, a first heater operatively associated with said first conduit means for heating the gas of said motor therein; said conduit means and said first heater comprising a first heater means, a regenerator, second conduit means connecting said first hot chamber with said regenerator, a second heater operatively associated with said second conduit means for heating the gas of said motor therein; said second conduit means comprising means forming a multiplicity of paths for the passage therethrough of the gas of said motor, said second conduit means and said second heater comprising a second heater means, means defining a first cold chamber, third conduit means connecting said regenerator with said first cold chamber, a first cooler operatively associated with said third conduit means for cooling the gas of said motor therein; said third conduit means and said first cooler comprising a first cooler means, means defining a second cold chamber, fourth conduit means connecting said first cold chamber with said second cold chamber, a second cooler operatively associated with said fourth conduit means for cooling the gas of said motor therein, said fourth conduit means and said second cooler means defining a second cooler means, said hot chambers, said heater means, said regenerator, said cooler means, and said cold chambers constituting separate cycle elements of said motor, and the minimum volume of said hot chambers being substantially zero as determined by constructional clearances of the hot chamber defining means.

6. A closed cycle hot-gas motor comprising a reciprocating displacer member defining a hot chamber, a regenerator, first conduit means connecting said hot chamber with said regenerator, a heater operatively associated with said conduit means for applying heat directly only to the gas in said conduit means and forming a heater means therewith, said conduit means comprising means forming a multiplicity of paths for the passage therethrough of the gas of said motor, a reciprocating piston member defining a cold chamber, second conduit means connecting said cold chamber with said regenerator, a cooler operatively associated with said second conduit means for cooling the gas of said motor therein; said second conduit means and said cooler comprising a cooler means, and a tubular member surrounding said displacer member, said heater, regenerator and cooler surrounding said tubular member, said hot chamber, heater means, regenerator, cooler means, and cold chamber constituting separate cycle elements of said motor, and the minimum volume of said hot chamber being substantially zero as determined by constructional clearances of the said displacer in the said hot chamber.

HERRE RINIA.
HEINRICH DE BREY.
FRANCISCUS LAMBERTUS VAN WEENEN.
YSBRAND BOERS.
GABRIEL LEONARD SYPKENS.
WILLEM JAN VAN HEECKEREN.

REFERENCES CITED

The following references are of record in the file of this patent:

UNITED STATES PATENTS

| Number | Name | Date |
|---|---|---|
| 11,696 | Napier et al. | Sept. 19, 1854 |
| 228,716 | Woodbury et al. | June 8, 1880 |
| 389,045 | Bair | Sept. 4, 1888 |
| 404,237 | Woodbury | May 28, 1889 |
| 437,320 | Vivian | Sept. 30, 1890 |
| 966,032 | Mann | Aug. 2, 1910 |
| 1,534,794 | Lundgaard | Apr. 21, 1925 |

FOREIGN PATENTS

| Number | Country | Date |
|---|---|---|
| 26,767 | Germany | May 28, 1884 |